July 4, 1939.    C. R. HANNA ET AL    2,165,049
VOLTAGE REGULATING SYSTEM
Filed Jan. 16, 1937    2 Sheets-Sheet 1
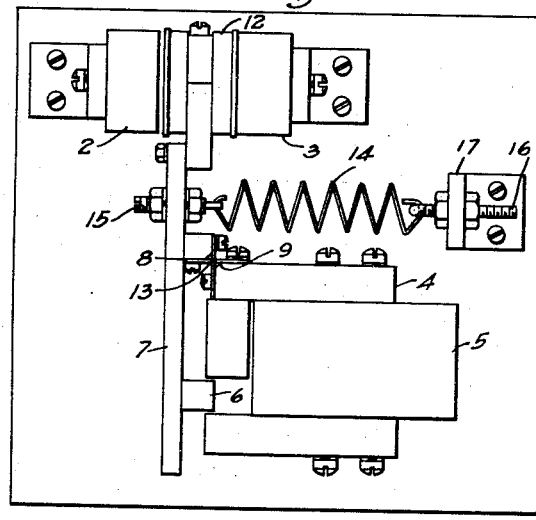
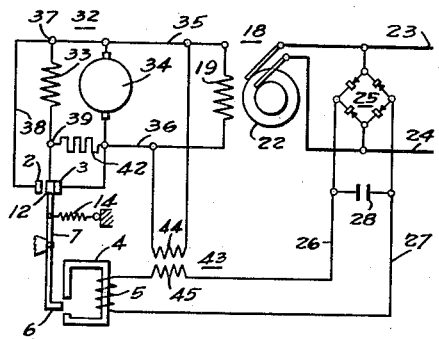
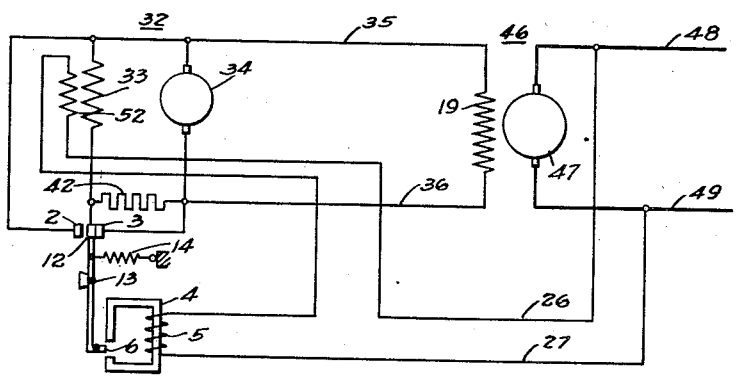
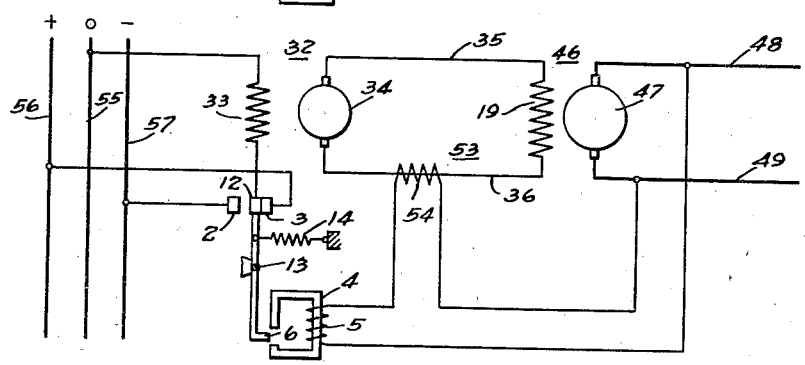
WITNESSES:
Michael Stark
F. E. Hardy
INVENTORS
Clinton R. Hanna
and Kirk A. Oplinger
BY
Ezra W. Savage
ATTORNEY July 4, 1939.                C. R. HANNA ET AL                2,165,049
                        VOLTAGE REGULATING SYSTEM
                        Filed Jan. 16, 1937         2 Sheets-Sheet 2
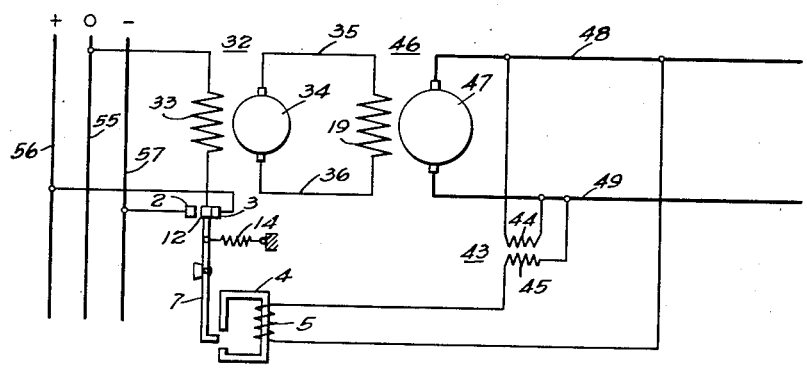
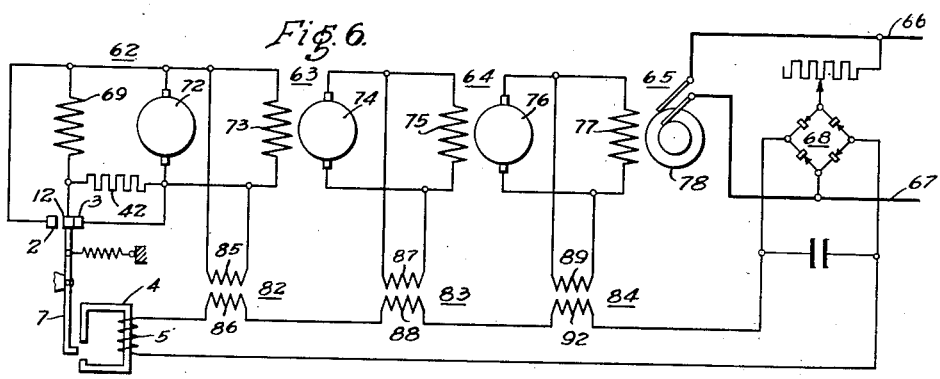
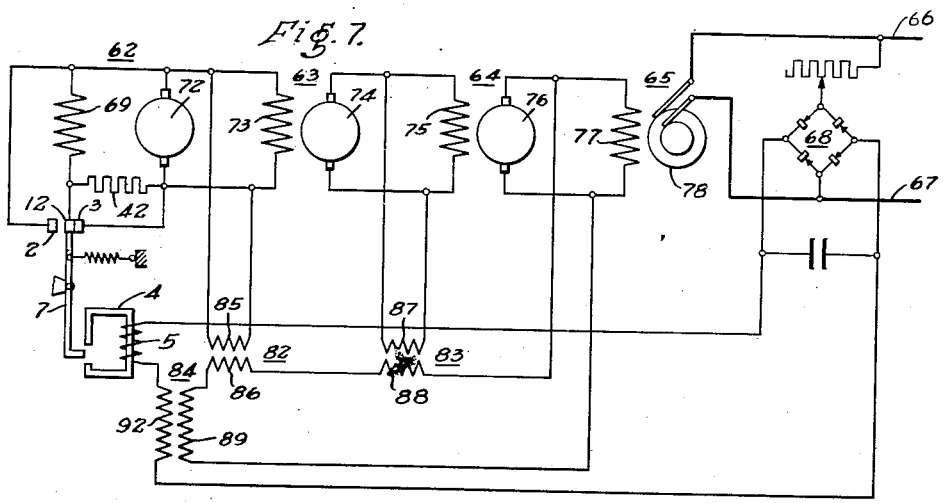
WITNESSES:                                    INVENTORS.
Michael Stark                              Clinton R. Hanna
                                          and Kirk A. Oplinger.
F. E. Hardy                                       BY
                                          Ezra N. Savage
                                                ATTORNEY Patented July 4, 1939

2,165,049

UNITED STATES PATENT OFFICE 2,165,049

VOLTAGE REGULATING SYSTEM

Clinton R. Hanna, Pittsburgh, and Kirk A. Oplinger, Verona, Pa., assignors to Westinghouse Electric & Manufacturing Company, East Pittsburgh, Pa., a corporation of Pennsylvania Application January 16, 1937, Serial No. 120,914

9 Claims. (Cl. 171—119)

Our invention relates to regulator systems and particularly to such systems that are adapted for maintaining constant an electric quantity, such as voltage.

When a vibrating regulator is used to control an exciter generator for supplying excitation to the main generator to maintain the voltage of the circuit supplied thereby constant, the voltages of the main and exciter generators usually becomes unstable and start hunting alternately above and below the desired value when an attempt is made to improve the regulation of the generator beyond a certain point.

Many anti-hunting devices have been provided for regulators to reduce such hunting. Such devices, in general, provide a damping action which slows down the rate of response of the regulator, or introduces a counter force into the regulator of such a nature as to interrupt the regulator action temporarily, thereby reducing its sensitivity.

It is an object of our invention to provide a regulator system that is highly sensitive and quickly responsive to changes in the regulated quantity from the desired value, and that introduces into the regulator action an anti-hunting force that is responsive to the rate of change of the corrective action.

It is a further object of our invention to provide a regulator system of the above indicated character in which a plurality of separate exciter units are provided connected in cascade, and from which a plurality of anti-hunting forces are introduced into the regulator action based on the rates of response of the several units.

Other objects and advantages of our invention will be apparent from the following description of certain illustrated embodiments thereof, reference being had to the accompanying drawings, in which:

Figure 1 is an elevational view of a regulator that is suitable for employment in the system of our invention;

Fig. 2 is a diagrammatic view of apparatus and circuits constituting one embodiment of the invention;

Figs. 3 to 5 are diagrammatic views illustrating other embodiments of the invention; and Figs. 6 and 7 are diagrammatic views illustrating the invention employed with cascade connected exciters.

Referring to Fig. 1 of the drawings, the regulator there illustrated corresponds to that described and claimed in application Serial No. 118,554 of C. R. Hanna, for Voltage regulator, filed December 31, 1936, and assigned to the same assignee as this application. The regulator comprises a supporting panel 1 upon which are suitably mounted stationary contact members 2 and 3 and a core structure 4 of magnetic material having a winding leg for accommodating an energizing winding 5 and providing a space in the magnetic structure for accommodating an armature 6 attached to a lever 7 that is pivotally mounted to the core structure by means of flat horizontal and vertical springs 8 and 9, respectively, and that carries, at its upper end, a movable contact member 12 that is adapted to engage the contact members 1 and 2. The lever 7 is biased by a spring 14 about a pivot axis 13 formed along the line of intersection of the planes of the horizontal springs and vertical springs 8 and 9, respectively. One end of the spring 14 is suitably attached to the lever 7 as by means of a stud 15 having an eyelet in one end thereof to receive the spring 14, the other end of the spring 14 being attached to a stud 16 carried by a bracket 17 mounted on the panel 1.

Referring to Fig. 2, a main generator 18 is provided having a field winding 19 and an armature winding 22 that is connected to line conductors 23 and 24 to supply alternating current thereto. A full wave rectifier 25 is provided, the alternating current terminals of which are connected between conductors 23 and 24 and the direct current terminals of which are connected by conductors 26 and 27 to the regulator winding 5. A condenser 28 or other means may be connected for filtering any alternating current vibrations from the circuit of conductors 26 and 27.

An exciter generator 32 is provided having a field winding 33 and an armature winding 34, the armature winding being connected by conductors 35 and 36 for energizing the field winding 19 of the main generator 18. One terminal 37 of the field winding 33 is connected to conductor 35 and to regulator contact member 2 by conductor 38, the other terminal 39 being connected to the movable regulator contact member 12 through resistor 42 to conductor 36. A feed back or anti-hunting transformer 43 is provided having a primary winding 44 that is connected to be energized in accordance with the voltage applied across the generator field winding 19, and a secondary winding 45 that is connected in the circuit between the rectifier 25 and the regulator winding 5.

When the generator and exciter voltages are constant, direct current flows in the primary winding 44 of the transformer 43 so that no current is induced in the secondary winding 45 thereof and the energization of the winding 5 is determined solely by the voltage applied thereto from conductors 23 and 24.

With the field resistor 42 shunted from the circuit of the exciter field winding 33 by engagement of the regulator contact members 12 and 3, as illustrated, the voltage of the exciter will build up causing the voltage of the main generator 18 to also increase until the pull on the winding 5 is sufficient to move the regulator lever arm 7 in a counterclockwise direction to separate the contact members 12 and 3 and to insert the resistor 42 in series with the exciter generator field winding 33, thus causing the voltage of the exciter generator and of the main generator to decrease. Upon this decrease in voltage, the decrease in energization of the regulator winding 5 also decreases so that the pull of the spring 14 becomes greater than the magnetic pull of the core 4, thus permitting the lever 7 to move in a clockwise direction to again cause engagement of the contact members 12 and 3 to again shunt the resistor 42 from the circuit of the exciter generator winding 33. The alternate engagement and separation of the contact members 12 and 3 take place very rapidly because of the high sensitivity of the regulator thus preventing wide departures in the regulator voltage from its desired value.

So long as the voltage impressed across the field winding 19 of the main generator 18 is constant, a unidirectional current of constant value will flow in the primary winding 44 of the transformer 43 and consequently no voltage will be induced thereby in the secondary winding 45. Upon a change in the voltage of the generator 18 from its desired value, the initial change in energization of the winding 5 is, therefore, solely determined by the voltage between conductors 23 and 24 which causes a movement of the regulator arm 7 in a direction to correct for departure of the generator voltage from its desired value. This correction causes a change in the voltage of the exciter generator 32, and a corresponding change in the voltage impressed across the primary winding 44 of the transformer 43, the rate of change of which determines the amount of voltage introduced in the secondary winding 45. The winding 45 is so connected in the circuit of the regulator winding 5 that a feedback voltage is introduced into the circuit thereof in a direction opposite to the change in voltage causing the regulator action. If, for example, the voltage of the generator 18 drops, the voltage across the regulator winding 5 correspondingly drops thus causing the regulator to effect an increase in the output voltage of the exciter generator 32 to thereby increase the output voltage of the main generator 18. The rate of change of the output voltage of the exciter generator 32 introduces into the winding 45 a voltage in a direction to increase the energization of the winding 5 and thereby cause separation of the contact members 12 and 3 sooner than would be effected were the winding 5 energized solely in accordance with the voltage impressed on conductors 26 and 27 from the rectifier 25. The feedback voltage applied to the winding 5 through the transformer 43 is thus a measure of the rate of build-up in the voltage across the main generator field 19 and anticipates the rate of recovery of the regulated quantity to its desired value, thus introducing into the regulator circuit a component of voltage to interrupt the main regulator action sufficiently before complete correction to prevent an excessive build-up in the voltage of the main generator beyond its desired value. Upon an increase in voltage across the conductors 23 and 24 above the desired value, the initial action of the regulator causes a decrease in the excitation of the exciter generator 32 and the main generator 18. The decrease in the output voltage of exciter generator 32 causes a change in current flow through the primary winding 44 of the transformer 43 which induces a feedback voltage in the winding 45 in a direction to decrease the energization of the winding 5 below the value of voltage supplied from the rectifier 25, thus permitting an earlier engagement of the contact members 12 and 3 to prevent the excitation of the exciter generator 32 and of the main generator 18 from decreasing sufficiently that the voltage across conductors 23 and 24 drops excessively below the desired value.

It will be appreciated that the contact member 12 engages and separates from engagement with the contact member 3 at a rapid rate so that, in effect, these contact members constitute a varying resistor which increases in value as the percentage of time that the contact member 12 is separated from engagement with the contact member 3 increases, and decreases in value as the percentage of time that the contact member 12 is in engagement with the contact member 3 increases.

Should the residual voltage of the exciter generator 32 become so high that the excitation of the field winding 33 required to maintain the desired voltage between conductors 23 and 24 is less than that which would be maintained if the resistor 42 were continuously in series with the field winding 33, the regulator will so operate that the contact member 12 vibrates into and out of engagement with the contact member 2 instead of with the contact member 3.

The embodiment of the invention illustrated in Fig. 3 is similar in fundamental operative characteristics to that illustrated in Fig. 2, the main generator 46 being shown as having a direct current armature winding 47 connected to circuit conductors 48 and 49. The regulator control circuit conductors 26 and 27 may, therefore, be directly connected to conductors 48 and 49 without the necessity of providing the rectifier 25 shown in Fig. 2. Also, in the embodiment illustrated in Fig. 3, a winding 52 that is inductively coupled to the field winding 33 of the exciter generator 32 is connected in circuit with the winding 5 to introduce the feedback voltage into the regulator circuit. The voltage induced in the winding 52 will be proportional to the rate of change of current in the field winding 33 and in a direction determined by the direction of current change.

A feedback voltage may be introduced into the circuit of the regulator winding 5 by means of a current transformer 53, as illustrated in Fig. 4, the secondary winding 54 thereof producing a current that is proportional to the rate of current change in the circuit of the main generator field winding 19, and the direction of which is dependent upon whether such field excitation current increases or decreases. In Fig. 4 also the field winding 33 of the exciter generator 32 is shown as being separately excited from conductors 55 and 56 if the regulation is controlled by cooperation between contact members 12 and 3 to provide one direction of energization of the field winding 33, the field winding being energized from conductors 55 and 57 when the regulator action is effected through cooperation of contact members 12 and 2 to provide a reverse direction of energization of the field winding 33.

In Fig. 5, another embodiment of the invention is illustrated employing a direct current main generator 46, and in which the primary winding 44 of the feedback transformer 43 is directly connected across conductors 48 and 49 that are connected to the armature winding 47 of the main generator 46. This arrangement provides the same character of regulation as when the primary winding 44 is connected across the output circuit of the exciter generator, as in Fig. 2, but requires a larger feedback transformer 43 to produce a corresponding feedback voltage since the time element of the machine 46 causes a slower change in the voltage across the conductors 48 and 49 than that which takes place between conductors 35 and 36 in response to a regulator action and therefore a lower voltage per turn in the winding 44.

In Fig. 6, a plurality of exciter generators 62, 63 and 64 are shown connected in cascade, each providing the source of energization of the field winding of the next machine for energizing the main generator 65 which supplies current to conductors 66 and 67, the voltage of which it is desired to maintain constant. Consequently, a full wave reactor 68 is connected between conductors 66 and 67 for providing unidirectional voltage to the regulator winding 5 that is proportional to the alternating voltage between conductors 66 and 67. The direct current exciter generator 62 comprises a self-excited field winding 69 and an armature winding 72 that supplies current to the field winding 73 of the exciter generator 63 and is provided with an armature winding 74 for supplying current to the field winding 75 of exciter generator 64, and which is provided with an armature winding 76 that, in turn, supplies current to the field winding 77 of the main generator 65, the armature winding 78 of which supplies alternating current to the conductors 66 and 67.

Feedback transformers 82, 83 and 84 are provided, the primary winding 85 of transformer 82 being connected across the armature winding 72 of exciter generator 62, the primary winding 87 of feedback transformer 83 being connected across armature winding 74 of exciter generator 63, and the primary winding 89 of the transformer 84 being connected across the armature winding 76 of exciter generator 64. The secondary windings 86, 88 and 92 of the feedback transformers 82, 83 and 84, respectively, are connected in series with the regulator winding 5 to introduce into the circuit thereof feedback voltages similar in direction to those discussed with respect to the previously described figures but which are responsive to the rate of change of the voltages of the three cascaded exciter generators 62, 63 and 64, respectively.

It will be appreciated that any number of exciter generators may be connected in cascade, as illustrated in Fig. 6, but three will ordinarily be all that is required to provide excitation for the largest generator employed today with a field current of approximately one-fourth ampere being required for the first exciter generator of the series. Thus the regulator contact members will be required to control current of the order of one-fourth ampere in order to amplify the output currents of the several exciters to a value sufficient to provide complete excitation for the generator 65. Since the machines increase in size from the first or smallest exciter 62 to the main generator 65, the time constants of the field windings of these machines correspondingly increase, so that the feedback voltage introduced into the regulator winding circuit through transformer 82 precedes the introduction of the feedback voltage introduced through transformers 83 and 84, and the feedback voltage introduced by transformer 83 is initiated before that produced by transformer 84, the several feedback voltages being additive to give complete anti-hunting action as the effect of the regulator action is felt on the main machine 65. Thus a very rapid and very accurate degree of anti-hunting or feedback current is introduced into the regulator winding so that machines so controlled may be governed by very sensitive and quick acting regulators without producing hunting action resulting from the cascading of machines. In Fig. 6, the feedback transformers 82, 83 and 84 are connected as shown in Figs. 2 and 5, but it will be appreciated that the particular means of introducing feedback current into the regulator winding circuit illustrated in Figs. 3 and 4 may be employed if desired. It will be appreciated that the series of cascade connected exciter generators constitute amplification devices for amplifying a relatively small corrective stimulus that is determined in part by variations in the regulated quantity and in part by the rate of response of the several generators or some of them to the influence of the corrective impulse.

It will be appreciated that since the time constants of the field windings of the machines 62, 63 and 64 expressed as $$\frac{L}{R}$$

where L is the inductance and R the resistance of the winding increase in series, because of the increased sizes of the machines in the cascade connection. It has been found that the time constants of the various feedback transformers expressed as $$\frac{M}{R}$$

where M is the mutual inductance between the windings and R is the resistance of the primary winding are related to the electrical characteristics of the fields across which they are connected. For stability purposes, that is to prevent hunting, the time constant $$\frac{M}{R}$$

of a feedback transformer must be equal to or greater than the time constant of the field damper bar or pole eddy current. For reasonably good damping of 60% decay per cycle of free voltage oscillations $$\frac{M}{R}$$

might be about one-tenth the time constant of the main field winding. In a machine where the time constant $$\frac{L_1}{R_1}$$

for the damper winding is 0.1 second and $$\frac{L}{R}$$

for the main field winding is 10 seconds a time constant for the feedback transformer of one second is very satisfactory. This gives a time constant that is ten times that of the damper bar and one-tenth that of the main field winding.

The secondary winding 92 of transformer 84 may be connected in circuit with the regulator winding 5, as shown in Fig. 7, the primary winding 89 being connected in series with the secondary winding 86 of the transformer 82 and with the secondary winding 88 of the transformer 83. This reduces the resistance of the transformer windings in series with the winding 5, thus reducing the error that might result from failure of voltage changes on the winding 5 following closely the changes in the output voltage of the rectifier 68.

It will be apparent to those skilled in the art that modifications may be made in the apparatus and circuits illustrated without departing from the spirit of our invention. We do not wish to be limited otherwise than by the scope of the appended claims.

We claim as our invention:

1. In a regulator system, a plurality of electric generators having field windings and arranged in series so that the output from one generator is employed to energize the field winding of the next generator in the series, means for controlling the excitation of said generators comprising a regulator having a winding and means including a circuit for energizing said winding in accordance with a voltage that is a measure of a regulated electrical quantity controlled by said generators, and means for introducing into said circuit stabilizing impulses proportional to the rates of change in the excitation of said several generators.

2. In a regulator system, a pilot element responsive to variations in a quantity to be regulated for controlling a relatively small corrective stimulus determined in part by said variations, a plurality of amplification devices connected in cascade for amplifying the effect of said corrective stimulus, and means for influencing said pilot element also in response to the rates of change of the out-puts of more than one of said amplification devices.

3. In a generator voltage regulator system, a pilot element responsive in part to variations in a regulated voltage from its desired value, means governed by said pilot element for controlling a relatively small corrective stimulus determined by said variations, a plurality of exciter generators connected in cascade for amplifying said corrective stimulus, and means for causing said pilot element to be responsive also to the rate of change of the output of one or more of said exciter generators.

4. In a regulator system, a regulating relay responsive to variations in a regulated quantity, means governed by said relay for controlling a small corrective stimulus determined in part by variations in the regulated quantity, a plurality of exciter generators connected in cascade for amplifying said corrective stimulus, and means for introducing into the circuit of said regulating relay stabilizing voltages determined by the rates of change in the output voltages of a plurality of said exciter generators.

5. In a regulator system, a regulator relay having a winding and circuit therefor, means for applying a voltage to said circuit that is a measure of the regulated quantity, a plurality of exciter generators connected in cascade and serially governed by said relay, and means comprising feedback transformers associated with said several exciter generators for introducing stabilizing voltages into the circuit of said relay winding that are determined by the rates of change in output voltages of said several exciter generators.

6. In a regulator system, an electric generator having a field winding, an exciter generator for energizing the field winding of said first named generator, means for controlling the excitation of said exciter generator comprising a regulator having a winding and a circuit for energizing said winding at a voltage that is a measure of a regulated electrical quantity controlled by said first named generator, and means for introducing into the circuit of the regulator winding stabilizing voltage components that are counter to the change in energization of said regulator winding and proportional respectively to the rates of change in excitation of said two generators.

7. In a regulator system, an electric generator having a field winding, an exciter generator for energizing said field winding, means for controlling the excitation of said exciter generator comprising a regulator having a winding and a circuit for energizing said winding in accordance with the voltage that is a measure of the regulated quantity controlled by said first named generator, and means comprising a plurality of feedback transformers responsive to the respective rates of change in excitation of said several generators, the several feedback transformers being designed to have time constants that are predetermined fractions of the time constants of their associated generators.

8. In a regulator system, a regulating relay responsive to variations in a regulated quantity, a plurality of amplification devices connected in series and having serially increasing time constants, means governed by said relay for developing a small corrective stimulus on the first of said amplification devices that is determined in part by variations in the regulated quantity and in part by the rates of response of the several amplification devices to the influence of the corrective impulse, the time constants of the means for determining the part responsive to the rates of response of the several amplification devices having progressively increasing time constants that are less than the time constants of their associated amplification devices.

9. In a regulator system, a regulator relay having a winding and circuit therefor, means for applying a voltage to said circuit that is a measure of the regulated quantity, a plurality of exciter generators connected in cascade and serially governed by said relay, said several exciter generators having progressively larger time constants than the preceding generator in the series, and means comprising feedback transformers associated with said serially connected exciter generators for introducing stabilizing voltages into the circuit of said relay winding that are determined by the rates of change in excitation of the several exciter generators, said several feedback transformers having time constants less than the time constants of their associated exciter generators.

CLINTON R. HANNA.
KIRK A. OPLINGER.